(12) United States Patent
Kumar et al.

(10) Patent No.: US 11,436,251 B2
(45) Date of Patent: Sep. 6, 2022

(54) DATA SIZE BASED REPLICATION

(71) Applicant: EMC IP Holding Company LLC, Hopkinton, MA (US)

(72) Inventors: Shiv S. Kumar, Pune (IN); Jai P. Gahlot, Pune (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 103 days.

(21) Appl. No.: 17/061,957

(22) Filed: Oct. 2, 2020

(65) Prior Publication Data

US 2022/0107955 A1 Apr. 7, 2022

(51) Int. Cl.
*G06F 16/00* (2019.01)
*G06F 16/27* (2019.01)

(52) U.S. Cl.
CPC .................... *G06F 16/27* (2019.01)

(58) Field of Classification Search
CPC ...................................................... G06F 16/27
See application file for complete search history.

(56) References Cited

U.S. PATENT DOCUMENTS

| 10,831,744 | B1* | 11/2020 | Harris | G06F 16/219 |
|---|---|---|---|---|
| 2005/0203908 | A1* | 9/2005 | Lam | H04L 41/22 |
| 2013/0262780 | A1* | 10/2013 | Manne | G06F 12/0888 |
| | | | | 711/E12.04 |
| 2014/0304230 | A1* | 10/2014 | Simon | G06F 16/27 |
| | | | | 707/634 |
| 2016/0357460 | A1* | 12/2016 | Muramatsu | G06F 3/065 |
| 2017/0132085 | A1* | 5/2017 | Wang | G06F 11/14 |
| 2018/0107596 | A1* | 4/2018 | Kelly | G06F 11/073 |
| 2018/0270308 | A1* | 9/2018 | Shea | H04L 67/1097 |
| 2019/0212928 | A1* | 7/2019 | Eberhard | G06F 16/27 |

* cited by examiner

*Primary Examiner* — Alexander Khong
(74) *Attorney, Agent, or Firm* — Amin, Turocy & Watson, LLP

(57) ABSTRACT

Techniques are provided for data size based replication. In an example, a replication daemon registers to receive notifications about data changes from a protocol driver. The replication daemon can maintain a counter for each of one or more replication policies, where a counter tracks how much data has changed that corresponds to a replication policy, since the prior replication for that replication policy. Where the daemon receives a notification for the protocol driver, it can determine whether the notification applies to any replication policy, and update any counters accordingly. Where an amount of data changed since the prior replication exceeds a threshold for a replication policy, a replication can be started. Upon successful completion of the replication, the corresponding counter can be reset.

20 Claims, 11 Drawing Sheets

DATA SIZE BASED REPLICATION

TECHNICAL FIELD

The present application relates generally to backing up computer data across multiple computing devices.

BACKGROUND

Data replication can generally comprise copying, or replicating, data from one computing device to another computing device for the purpose of backup. For example, data can be replicated from a first computing cluster (which can be a set of computing devices that work together and can be logically considered to be a single computing system) to a second computing cluster. Then, if the first computing cluster fails, the second computing cluster can possess an updated state of the first computing cluster, and can take over services provided by the first computing cluster, such as data storage and access.

Storage systems can implement a replication facility to provide for data recovery in event of disaster. An example of a replication facility is a DELL ISILON SYNCIQ replication service. Some replication services implement a time based replication. In a time based replication, a recovery point objective (RPO) can be defined that refers to a tolerance for data loss, and is expressed as an amount of time (e.g., four hours, or one day). That is, a tolerance for data loss can be that up to four hours of the most recent data is lost.

A replication service can maintain a schedule such that the RPO is met. For instance, with a four-hour RPO, a replication can be scheduled to migrate data at least every four hours.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
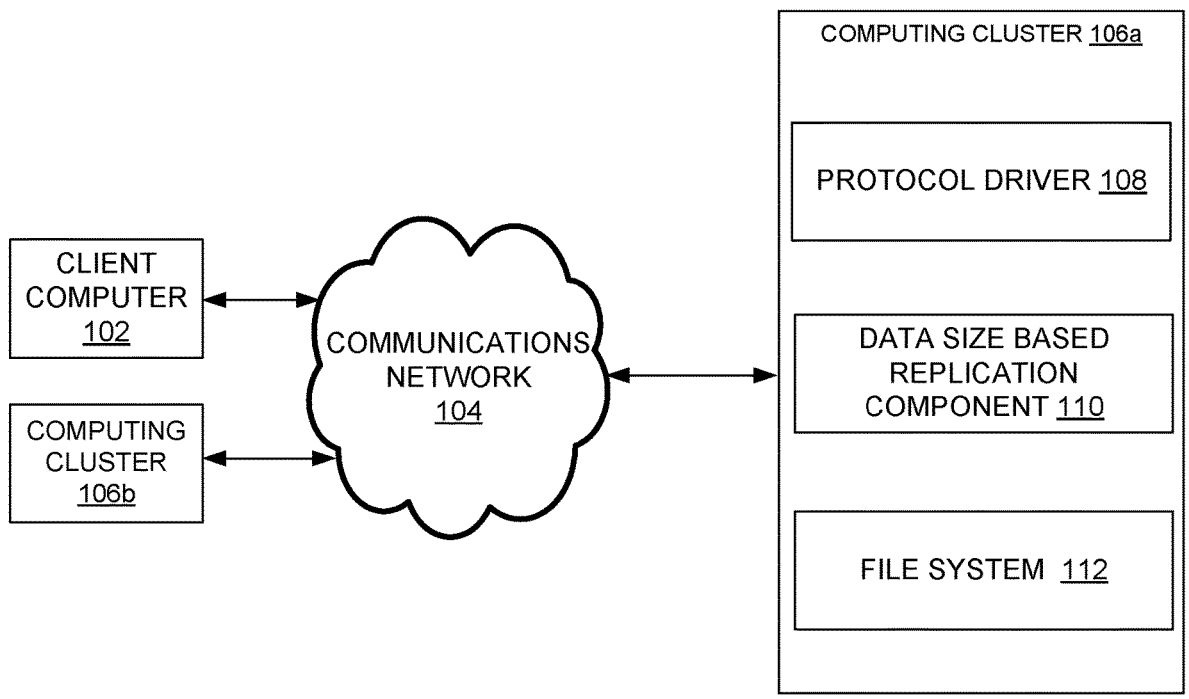
FIG. 1 illustrates an example system architecture that can facilitate data size based replication, in accordance with certain embodiments of this disclosure.

A problem with time based replication approaches is that the configured replication schedules can be static, because they start data migration for a replication on a specified time, and periodically. However, an amount of data that is changed between two replications can vary drastically, since the corresponding amount of I/O on the system can greatly vary. On some days, a given workflow can produce a larger amount of data than on other days. Since a time based replication policy starts only on a specified schedule time, it can expose a larger risk of losing data, where more data was modified during that time period.

A solution to this problem can be to implement data size based replication. In a data size based replication, a replication data objective (RDO) can be defined that refers to a tolerance for data loss, and is expressed as a number of bytes (e.g., 1 gigabyte (GB)).

A replication policy can define a RDO. Where a RDO is defined in a replication policy, a replication can be started as soon as the RDO threshold is reached. For example, a replication can be started as soon as 1 GB of data change has been registered for a set of files that are defined in a replication policy.

In some examples where replication is performed by a daemon (which can be a computer program that runs as a background process on a computer system), a RDO daemon can handle monitoring for a RDO trigger. Where the RDO daemon determines that the RDO trigger is met, the RDO daemon can start a replication triggered by the RDO trigger.

It can be appreciated that this is an example, and there can be example architectures that implement multiple daemons to carry out these functions, or the present techniques are implemented without the use of daemons.

In some examples, data size based replication can be implemented as follows, such as by a RDO daemon. A RDO daemon can load a replication path and file filters for each of one or more replication policies. For each of these replication policies, the RDO daemon can create a counter, which can be used to track how much data has changed since a previous replication. In some examples, replication policies are stored by a configuration store and that sends a notification to the RDO daemon when there is a change to a replication policy that implements data size based replication.

A RDO daemon can register with one or more protocol drivers that processes data changes to receive a notification about data changes. The RDO daemon can register a callback with each protocol driver to receive a notification about input/output details (such as a file path, an input/output type, and a number of bytes in the change), for close-modified, rename, and delete operations.

For each data change notification from a protocol driver received by the RDO daemon, the RDO daemon determine the file path for the data change as specified in the notification. The RDO daemon can determine if the file path matches a replication path of any replication policies. If the file path does match a replication path for any file policies, then the RDO daemon can apply any file exclude/include filters for the matched replication policy on the file path. If the file path does not match a replication path for any file policies, or after applying any file exclude/include filters for the matched replication policy on the file path, the RDO daemon determines that the file path should not be replicated, then the RDO daemon can discard the information associated with the replication.

Where the RDO daemon determines that the file path should be replicated, then the RDO daemon can extract the matched replication policy name. The RDO daemon can increment the replication policy's counter by a number of bytes of the data change, as specified in the notification. If the RDO daemon determines that the value of the counter is now at least as large as a RDO defined for the replication policy, then the RDO daemon can send a start job notification to the RPO daemon, which can start a replication corresponding to the replication policy.

After a replication is successfully completed, the counter for the corresponding replication policy can be reset, so that it measures an amount of data changed since the prior replication for that replication policy.

Example Architectures

FIG. 1 illustrates an example system architecture 100 that can facilitate data size based replication, in accordance with certain embodiments of this disclosure. As depicted, system architecture 100 comprises client computer 102, communications network 104, computing cluster 106a, and computing cluster 106b. In turn, computing cluster 106a comprises protocol driver 108, data size based replication component 110, and file system 112.

Figure 11:
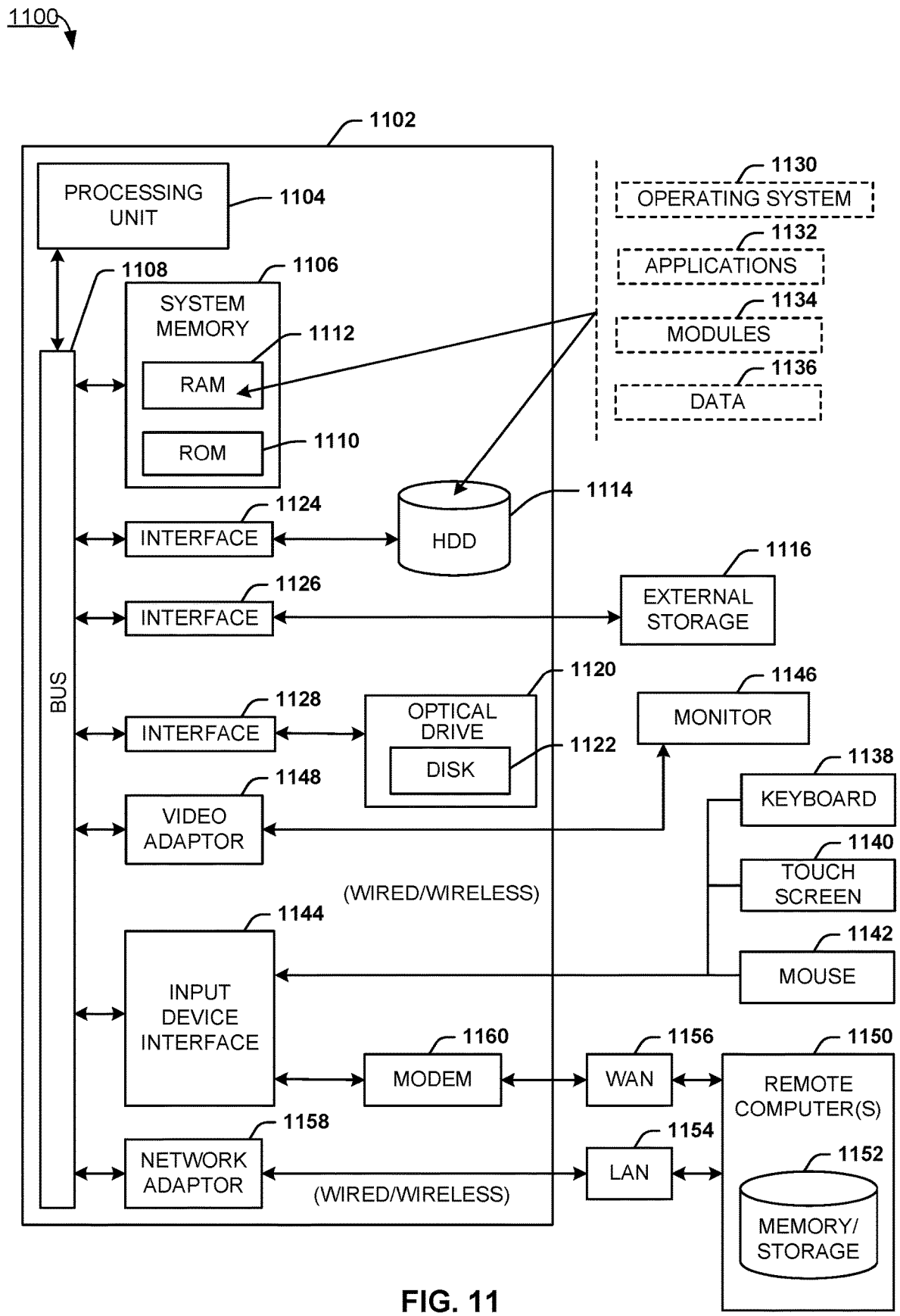
FIG. 11 illustrates an example block diagram of a computer operable to execute certain embodiments of this disclosure.

Each of client computer 102, computing cluster 106a, and computing cluster 106b can be implemented with one or more instances of computer 1102 of FIG. 11.

Communications network 104 can comprise a computer communications network, such as the INTERNET, or an isolated private computer communications network.

Protocol driver 108 can comprise a driver that receives one or more network communications from client computer 102 via communications network 104. These network communications can specify a file system operation to perform according to a particular protocol, such as an object storage protocol, or a file storage protocol (like a server message block (SMB) protocol, or a network file system (NFS) protocol). Protocol driver 108 can translate these network communications into a protocol understood by file system 112, and send the translated communications to file system 112 to be processed, such as for data to be written to or read from computing cluster 106a.

In some examples, protocol driver 108 processes network communications in multiple protocols. In other examples, there can be multiple instances of protocol driver 108, which each process network communications according to one different protocol.

Data size based replication component 110 can comprise a computer process that handles RDO replication. Data size based replication component 110 can register with protocol driver 108 to receive notifications about data changes on file system 112. Where data size based replication component 110 determines that a threshold amount of data changes have been made that correspond to a replication policy, data size based replication component 110 can start a replication for that replication policy. Data size based replication component 110 can maintain a counter for each replication policy that tracks how much data (in bytes) has been changed since a prior replication for that policy. Upon successfully completing a replication, data size based replication component 110 can reset the counter that corresponds to the replication policy.

In some examples, some additional data is modified while a replication is being performed. Let that amount of data be X bytes. In such examples, rather than resetting the counter to 0 after successful replication, the counter can be reset to X.

In some examples, data size based replication component 110 can implement aspects of the process flows of FIGS. 3-10 to facilitate data size based replication.

File system 112 comprises a file system driver that processes requests for services of a file system, and a file system that organizes how data is stored on computer storage, such as a hard disk.

Example Process Flows

Figure 2:
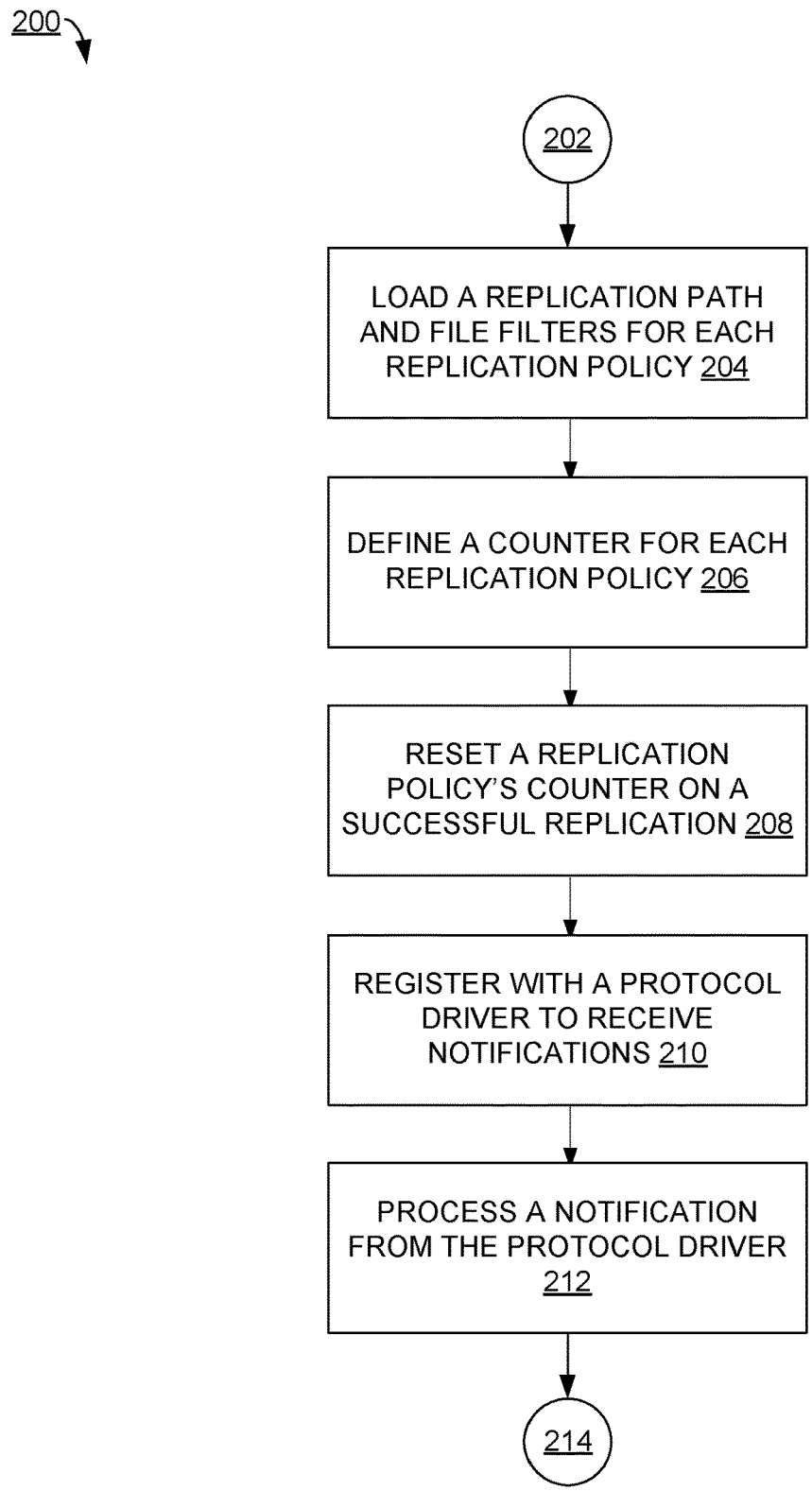
FIG. 2 illustrates an example process flow for data size based replication, in accordance with certain embodiments of this disclosure.

FIG. 2 illustrates an example process flow 200 for data size based replication, in accordance with certain embodiments of this disclosure. In some examples, aspects of process flow 200 can be implemented by computing cluster 106a of FIG. 1, or computing environment 1100 of FIG. 11.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 200 can be implemented in conjunction with aspects of one or more of process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, and process flow 1000 of FIG. 10.

Process flow 200 begins with 202 and moves to operation 204. Operation 204 depicts loading a replication path and file filters for each replication policy. This can comprise data size based replication component 110 of FIG. 1 loading a replication policy that is stored as one or more files in in file system 112. A replication policy can generally define files or types of files (e.g., all files in a given directory, or files smaller than a certain size) to be replicated, a target computing cluster to perform the replication to (e.g., computing cluster 106b of FIG. 1), and one or more criterion for performing a replication (e.g., a RDO that defines a data threshold for triggering a replication). A replication path can identify one or more files stored in file system 112 that are subject to being replicated by the replication policy, and identified by their file path. A file filter can further define which files to include in, or exclude from, a replication.

There can be more than one replication policy stored at a known location in file system 112, and in some examples, each of these replication policies can be loaded. After operation 204, process flow 200 moves to operation 206.

Operation 206 depicts defining a counter for each replication policy. A counter can be a data structure that can store a number, and have that stored number changed over time, such as an integer data structure. In operation 206, defining a counter can comprise creating a new data structure in memory for a counter, and doing this for each replication policy. After operation 206, process flow 200 moves to operation 208.

Operation 208 depicts resetting a replication policy's counter on a successful replication. A counter can be used to track how much data that corresponds to a given replication policy has been modified since the last replication for that replication policy. In these examples, upon successfully completing a replication, the corresponding counter can be reset (such as to zero) so that the counter will continue to track much data that corresponds to a given replication policy has been modified since the last replication for that replication policy. That is, immediately upon a successful replication it can be that there is not yet any data that has been modified since the prior replication. After operation 208, process flow 200 moves to operation 210.

Operation 210 depicts registering with a protocol driver to receive notifications. In some examples, operation 210 can comprise data size based replication component 110 of FIG. 1 sending an input/output (I/O) request packet (IRP) to protocol driver 108 that indicates registering to receive notifications. The notifications can relate to file changes that are processed by protocol driver 108. After operation 210, process flow 200 moves to operation 212.

Operation 212 depicts processing a notification from the protocol driver. Where protocol driver 108 of FIG. 1 processes a file change, protocol driver 108 can send a notification of this to data size based replication component 110. Data size based replication component 110 can then process this notification to determine whether it relates to any replication policies. Where this notification relates to at least one replication policy, and where the amount of data change indicated by this notification triggers a RDO, then data size based replication component 110 can start a corresponding replication.

In the course of processing a notification in operation 212, data size based replication component 110 can implement aspects of one or more of the process flows of FIGS. 3-7. After operation 212, process flow 200 moves to 214, where process flow 200 ends.

Figure 3:
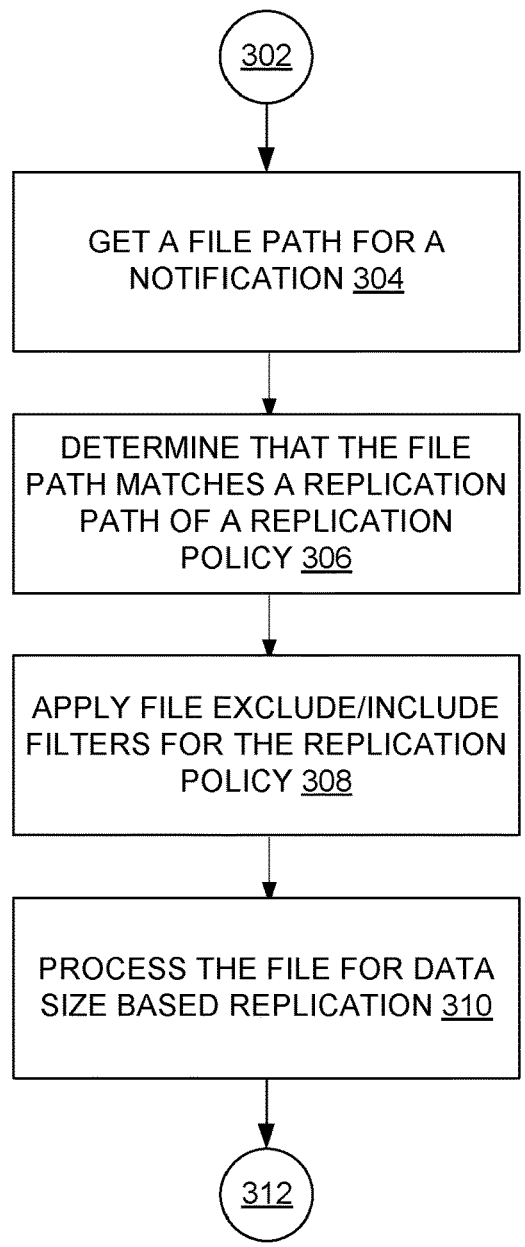
FIG. 3 illustrates an example process flow for processing a notification for data size based replication, in accordance with certain embodiments of this disclosure.

FIG. 3 illustrates an example process flow 300 for processing a notification for data size based replication, in accordance with certain embodiments of this disclosure. Generally, in process flow 300, a notification's file path is part of a replication policy, so the notification is processed for purposes of data size based replication. In some examples, aspects of process flow 300 can be implemented by computing cluster 106a of FIG. 1, or computing environment 1100 of FIG. 11.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with aspects of one or more of process flow 200 of FIG. 2, process flow 400 of FIG. 4, process flow 500 of FIG. 5, process flow 600 of FIG. 6, process flow 700 of FIG. 7, process flow 800 of FIG. 8, process flow 900 of FIG. 9, and process flow 1000 of FIG. 10.

Process flow 300 begins with 302 and moves to operation 304. Operation 304 depicts getting a file path for a notification. This notification can be one received in a similar manner as operation 212 of FIG. 2. A notification received from protocol driver 108 of FIG. 1 can be a notification of a file change. The notification can identify information that includes a file path that corresponds to the change, and an amount of data that is changed. In such examples, operation 304 can comprise parsing the notification to determine the file path, which is stored at a known location within a notification. After operation 304, process flow 300 moves to operation 306.

Operation 306 depicts determining that the file path matches a replication path of a replication policy. Data size based replication component 110 of FIG. 1 can have loaded replication policies, similar to operation 204 of FIG. 2. Data size based replication component 110 can take the file path for a notification determined in operation 304, and compare it to replication paths (i.e., a file path covered by a given replication policy) to identify matches. After operation 306, process flow 300 moves to operation 308.

Operation 308 depicts applying file exclude/include filters for the replication policy. A replication policy can identify exclude/include filters in addition to file paths. An exclude/include filter can identify files matched in a replication path that should otherwise be excluded from replication. After operation 308, process flow 300 moves to operation 310.

Operation 310 depicts processing the file for data size based replication. In some examples, implementing operation 310 comprises implementing aspects of the process flows of FIGS. 6-7. After operation 310, process flow 300 moves to 312, where process flow 300 ends.

Figure 4:
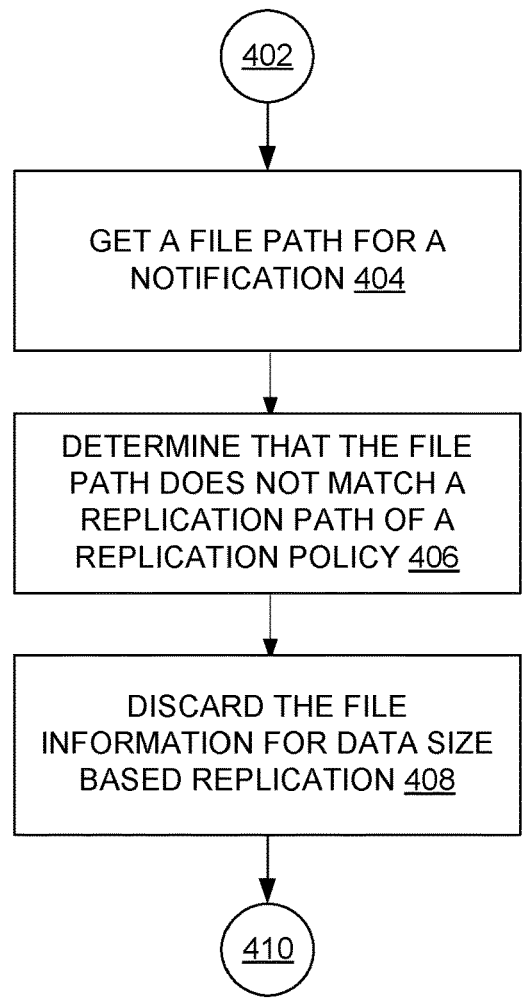
FIG. 4 illustrates another example process flow for processing a notification for data size based replication, in accordance with certain embodiments of this disclosure.

FIG. 4 illustrates another example process flow 400 for processing a notification for data size based replication, in accordance with certain embodiments of this disclosure. Generally, in process flow 400, a notification's file path does not correspond to a replication path, so the notification is discarded for purposes of data size based replication. In some examples, aspects of process flow 400 can be implemented by computing cluster 106a of FIG. 1, or computing environment 1100 of FIG. 11.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with aspects of one or more of process flow 200 of FIG. 2, process flow 300 of FIG. 3, process flow 500 of FIG. 5, process flow 600 of FIG. 6, process flow 700 of FIG. 7, process flow 800 of FIG. 8, process flow 900 of FIG. 9, and process flow 1000 of FIG. 10.

Process flow 400 begins with 402 and moves to operation 404. Operation 404 depicts getting a file path for the notification. In some examples, operation 304 can be implemented in a similar manner as operation 404 of FIG. 4. After operation 404, process flow 400 moves to operation 406.

Operation 406 depicts determining that the file path does not match a replication path of a replication policy. In some examples, operation 406 can be implemented in a similar manner as operation 306 of FIG. 3, but where the file path of operation 404 is determined not to match a replication path of any replication policy. After operation 406, process flow 400 moves to operation 408.

Operation 408 depicts discarding the file information for data size based replication. In some examples, operation 408 can comprise determining not to perform further processing for the notification. In other examples where notifications are stored by data size based replication component 110 of FIG. 1 in a queue, operation 408 can comprise removing the notification from the queue.

As a result of determining that a notification does not have a file path that matches any replication path, data size based replication component 110 can ignore the notification, rather than incrementing any RDO counters for replication policies, and possibly triggering a replication to start. After operation 408, process flow 400 moves to 410, where process flow 400 ends.

Figure 5:
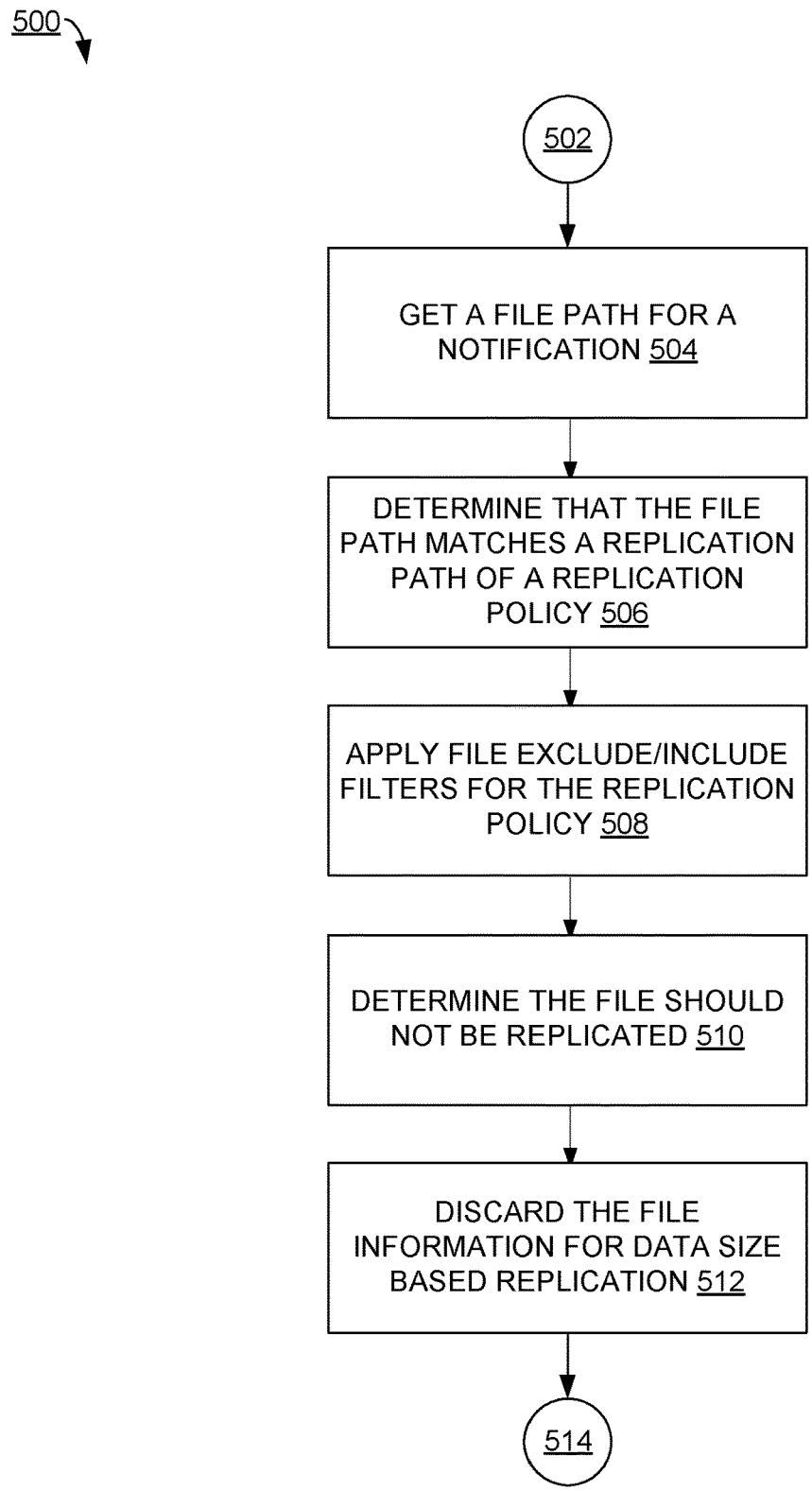
FIG. 5 illustrates an example process flow for processing a notification for data size based replication, in accordance with certain embodiments of this disclosure.

FIG. 5 illustrates an example process flow 500 for processing a notification for data size based replication, in accordance with certain embodiments of this disclosure. Generally, in process flow 500, it is determined that a notification's file path should not be replicated based on applying exclude/include filters, so the notification is discarded for purposes of data size based replication. In some examples, aspects of process flow 500 can be implemented by computing cluster 106a of FIG. 1, or computing environment 1100 of FIG. 11.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with aspects of one or more of process flow 200 of FIG. 2, process flow 300 of FIG. 3, process flow 400 of FIG. 4, process flow 600 of FIG. 6, process flow 700 of FIG. 7, process flow 800 of FIG. 8, process flow 900 of FIG. 9, and process flow 1000 of FIG. 10.

Process flow 500 begins with 502 and moves to operation 504. Operation 504 depicts getting a file path for a notification. In some examples, operation 508 can be implemented in a similar manner as operation 304 of FIG. 3. After operation 504, process flow 500 moves to operation 506.

Operation 506 depicts determining that the file path matches a replication path of a replication policy. In some examples, operation 506 can be implemented in a similar manner as operation 306 of FIG. 3. After operation 506, process flow 500 moves to operation 508.

Operation 508 depicts applying file exclude/include filters for the replication policy. In some examples, operation 508 can be implemented in a similar manner as operation 308 of FIG. 3. After operation 508, process flow 500 moves to operation 510.

Operation 510 depicts determining the file should not be replicated. That is, data size based replication component 110 can determine that the file path of the notification is in a replication path of a replication policy; but the file is also subject to an exclude/include filter of the replication policy that indicates that the file is not to be replicated. After operation 510, process flow 500 moves to operation 512.

Operation 512 depicts discarding the file information for data size based replication. In some examples, operation 512 can be implemented in a similar manner as operation 408 of FIG. 4. After operation 512, process flow 500 moves to 514, where process flow 500 ends.

Figure 6:
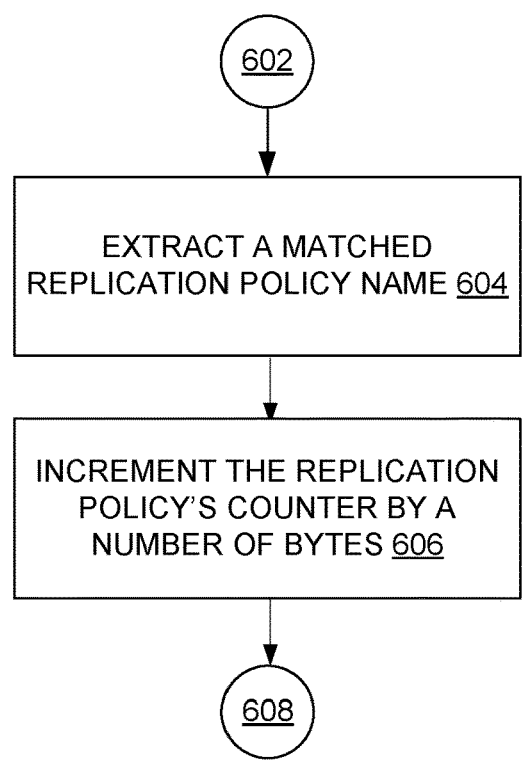
FIG. 6 illustrates an example process flow for processing a notification for data size based replication, in accordance with certain embodiments of this disclosure.

FIG. 6 illustrates an example process flow 600 for processing a notification for data size based replication, in accordance with certain embodiments of this disclosure. In some examples, aspects of process flow 600 can be utilized to implement operation 310 of FIG. 3, which depicts processing a file for data size based replication. In some examples, aspects of process flow 600 can be implemented by computing cluster 106a of FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with aspects of one or more of process flow 200 of FIG. 2, process flow 300 of FIG. 3, process flow 400 of FIG. 4, process flow 500 of FIG. 5, process flow 700 of FIG. 7, process flow 800 of FIG. 8, process flow 900 of FIG. 9, and process flow 1000 of FIG. 10.

Process flow 600 begins with 602 and moves to operation 604. Operation 604 depicts extracting a matched replication policy name. For example, operation 604 can be implemented after operation 306 of FIG. 3, which depicts determining that the file path matches a replication path of a replication policy. Having determined that there is a match between a file path and a replication path, data size based replication component 110 can determine which replication policy corresponds to the matched replication path (and in some examples, multiple replication policies can correspond to a matched replication path). After operation 604, process flow 600 moves to operation 606.

Operation 606 depicts increasing the replication policy's counter by a number of bytes. Having identified a replication policy that corresponds to the notification in operation 604, data size based replication component 110 can then identify a counter that it maintains for that replication policy. Data size based replication component 110 can then increase the counter by a number of bytes (or another measure of data size) of data change identified by the notification. In some examples, the notification can also include a measure of how much data was changed (e.g., measured in bytes) along with the file path. After operation 606, process flow 600 moves to 608, where process flow 600 ends.

Figure 7:
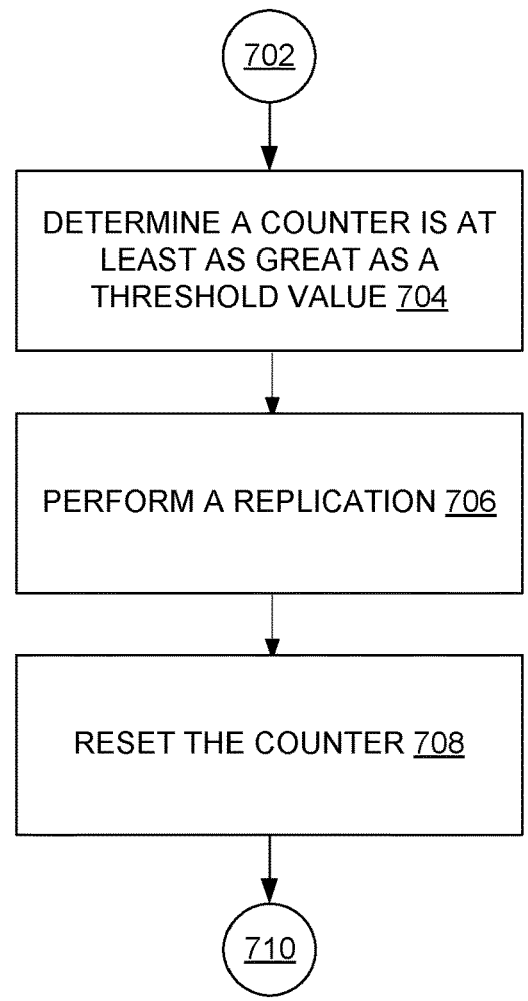
FIG. 7 illustrates an example process flow for processing a notification for data size based replication, in accordance with certain embodiments of this disclosure.

FIG. 7 illustrates an example process flow 700 for processing a notification for data size based replication, in accordance with certain embodiments of this disclosure. In some examples, aspects of process flow 700 can be utilized to implement operation 310 of FIG. 3, which depicts processing a file for data size based replication. In some examples, aspects of process flow 700 can be implemented by computing cluster 106a of FIG. 1, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with aspects of one or more of process flow 200 of FIG. 2, process flow 300 of FIG. 3, process flow 400 of FIG. 4, process flow 500 of FIG. 5, process flow 600 of FIG. 6, process flow 800 of FIG. 8, process flow 900 of FIG. 9, and process flow 1000 of FIG. 10.

Process flow 700 begins with 702 and moves to operation 704. Operation 704 depicts determining a counter is at least as great as a threshold value. In some examples, the threshold value is an amount of data that can change before a replication is triggered, and is defined by a RDO. Data size based replication component 110 can, after incrementing a counter (which can be performed similar to operation 606 of FIG. 6), determine that the counter now has a value at least as great as a threshold defined by a corresponding RDO. After operation 704, process flow 700 moves to operation 706.

Operation 706 depicts performing a replication. Performing a replication can comprise data size based replication component 110 of FIG. 1 copying, or replicating, data subject to the corresponding replication policy from computing cluster 106a to computing cluster 106b (which can be a target for the replication as defined in the replication policy). After operation 706, process flow 700 moves to operation 708.

Operation 708 depicts resetting the counter. Resetting the counter can comprise data size based replication component 110 of FIG. 1 setting the counter to have a value that indicates that no data has been changed that corresponds to the counter's replication policy since the prior replication has been performed. This value can be zero. After operation 708, process flow 700 moves to 708, where process flow 700 ends.

Figure 8:
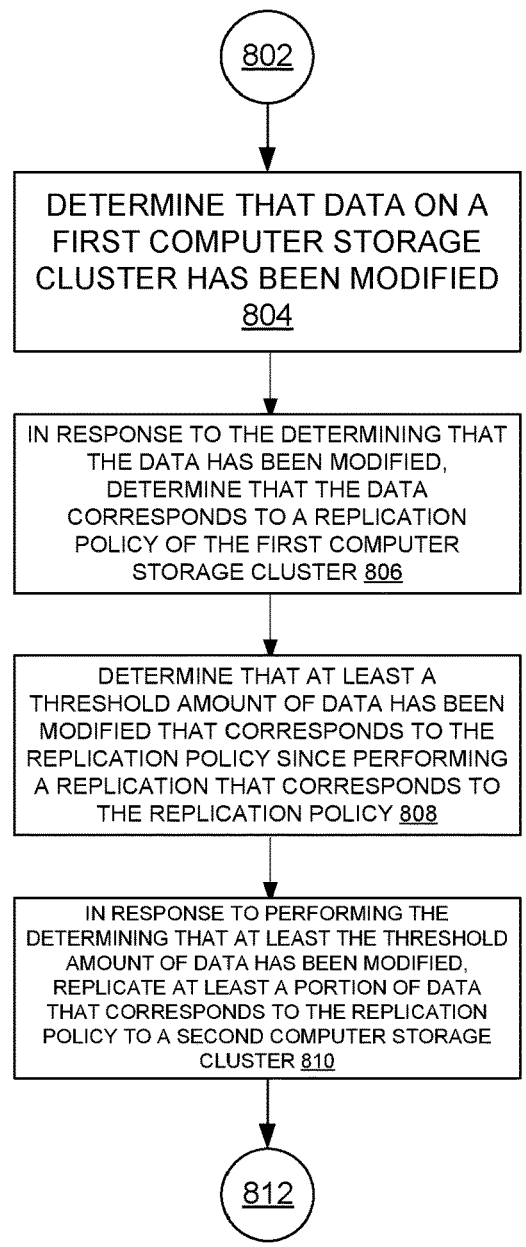
FIG. 8 illustrates an example process flow for data size based replication, in accordance with certain embodiments of this disclosure.

FIG. 8 illustrates an example process flow 800 for data size based replication, in accordance with certain embodiments of this disclosure. In some examples, aspects of process flow 800 can be implemented by computing cluster 106a of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with aspects of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 900 of FIG. 9, and process flow 1000 of FIG. 10.

Process flow 800 begins with 802 and moves to operation 804.

Operation 804 depicts determining that data on a first computer storage cluster has been modified. Using the example system architecture 100 of FIG. 1, this can comprise protocol driver 108 modifying data in file system 112, and also sending a notification of this modification to data size based replication component 110, which has registered with protocol driver 108 to receive notifications about file modifications.

In some examples, operation 804 comprises registering with a protocol driver that processes data modifications made to a file system of the first computer storage cluster to receive notifications about data modifications. In some examples, operation 804 comprises providing the protocol driver with a callback function that the protocol driver calls to send notifications about data changes.

After operation 804, process flow 800 moves to operation 806.

Operation 806 depicts, in response to the determining that the data has been modified, determining that the data corresponds to a replication policy of the first computer storage cluster. A replication policy can indicate that certain parts of file system 112 are to be replicated—for example a specific user folder (and its files and subfolders) is to be replicated according to one particular replication policy, but another user folder is not to be replicated according to that replication policy.

In some examples, data size based replication component 110 can implement multiple replication policies, and determine whether a file modification applies to any of these replication policies.

In some examples, operation 806 comprises extracting a matched replication policy name corresponding to the data from a file path indicated by a notification received from a protocol driver, the matched replication policy name identifying the replication policy. That is, one or more replication policies that this data modification corresponds to can be identified based on a file path specified in the notification received from the protocol driver.

After operation 806, process flow 800 moves to operation 808.

Operation 808 depicts determining that at least a threshold amount of data has been modified that corresponds to the replication policy since performing a replication that corresponds to the replication policy. Data size based replication component 110 can maintain a counter for each replication policy, where the counter tracks an amount of data for that replication policy that has been modified since a previous replication for that replication policy. In an example, this counter can track an amount of data as measured in bytes. In some examples, this can be expressed as incrementing a counter that corresponds to the replication policy by an amount of data modified indicated by the notification. That is, in some examples the notification can contain a number that indicates how much data was modified, and can be determined without directly examining the modified data.

When protocol driver 108 sends a notification of a data modification to data size based replication component 110, this notification can indicate an amount of data that is modified. Data size based replication component 110 can add this amount to each counter of a replication policy to which the data modification applies. After operation 808, process flow 800 moves to operation 810.

Operation 810 depicts, in response to performing the determining that at least the threshold amount of data has been modified, replicating at least a portion of data that corresponds to the replication policy to a second computer storage cluster. Take an example where a new replication is to be started every time 1 GB of data has been modified since the prior replication for that replication policy. In operation 810, the amount of data modification added to the counter can take the counter above this 1 GB threshold (e.g., the counter was at 975 megabytes (MB), and the modification is for 200 MB).

Upon determining that the threshold amount of data medication has been met for a replication policy, data size based replication component 110 can start a replication for that replication policy, where the data of that replication policy is replicated to one or more other computers.

In some examples, using a counter to track how much data is modified comprises maintaining a first counter that tracks an amount of modified data that corresponds to the replication policy and incrementing the first counter by an amount of the data that has been modified. Additionally, in some examples, performing the determining that at least the threshold amount of data has been modified comprises determining that a first value of the first counter is at least as large as a second value of the threshold amount of data. In some examples, using the counter comprises, after successfully performing the replicating of at least the portion of data that corresponds to the replication policy, resetting the first counter.

In some examples, using a counter comprises, in response to determining that performing a second replication is unsuccessful, determining not to reset a second counter that corresponds to the second replication. That is, a counter can be reset after a successful replication, and not reset where a replication is attempted, but is not successfully completed.

After operation 810, process flow 800 moves to 812, where process flow 800 ends.

Figure 9:
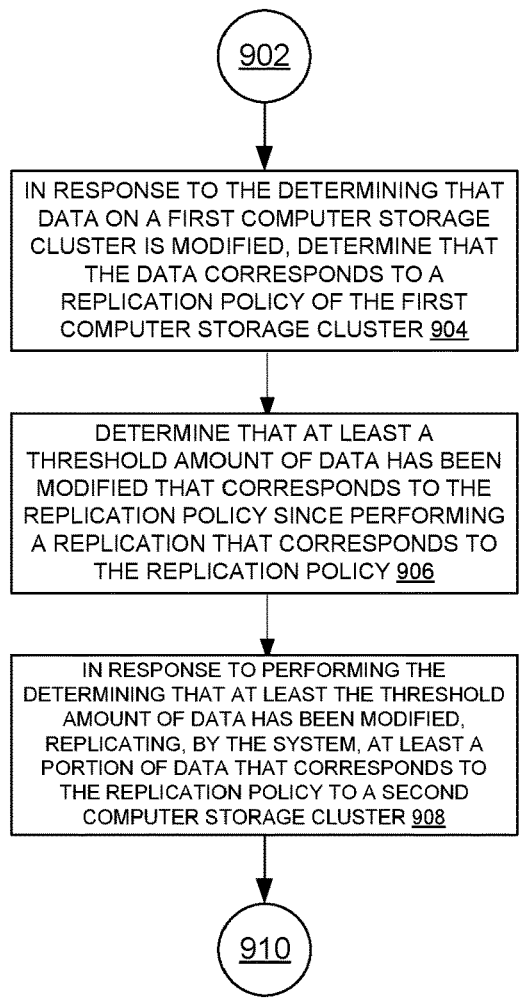
FIG. 9 illustrates an example process flow for data size based replication, in accordance with certain embodiments of this disclosure.

FIG. 9 illustrates an example process flow 900 for data size based replication, in accordance with certain embodiments of this disclosure. In some examples, aspects of process flow 900 can be implemented by computing cluster 106a of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with aspects of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, and process flow 1000 of FIG. 10.

Process flow 900 begins with 902 and moves to operation 904.

Operation 904 depicts, in response to the determining that data on a first computer storage cluster is modified, determining that the data corresponds to a replication policy of the first computer storage cluster. In some examples, operation 904 can be implemented in a similar manner as operations 804 and 806 of FIG. 8.

In some examples, operation 904 comprises registering with a protocol driver that processes data modifications on a file system of the first computer storage cluster to receive notifications about data modifications. That is, data size based replication component 110 of FIG. 1 can register with protocol driver 108 to receive notifications about modifications that protocol driver 108 makes to file system 112.

In some examples, operation 904 comprises receiving a notification from the protocol driver indicating that the first data is modified. That is, data size based replication component 110 can determine that data is modified as a result of receiving a notification from protocol driver 108.

In some examples, operation 904 determining that a file path that is identified by the notification corresponds to the replication policy. That is, data size based replication component 110 can determine that data corresponds to a particular replication policy by a file path specified in the notification from protocol driver 108.

In some examples, operation 904 comprises determining that the file path that is identified by the notification corresponds to a second replication policy, wherein a first set of files of the first replication policy differs from a second set of files of the second replication policy. That is, data size based replication component 110 can implement multiple replication policies, which can overlap with each other in the portions of file system 112 that they replicate.

In some examples, operation 904 comprises, in response to performing the determining that the file path that is identified by the notification corresponds to the replication policy, determining that the first file corresponding to the data is omitted from an exclude filter of the first replication policy. In some examples, operation 904 comprises, in response to performing the determining that the file path that is identified by the notification corresponds to the replication policy, determining that the first file corresponding to the data is included in an include filter of the first replication policy. That is, after matching a file path for a replication policy, data size based replication component 110 can then apply exclude/include filters to determine whether the data is part of the replication policy.

After operation 904, process flow 900 moves to operation 906.

Operation 906 depicts determining that at least a threshold amount of data has been modified that corresponds to the replication policy since performing a replication that corresponds to the replication policy. In some examples, operation 906 can be implemented in a similar manner as operation 808 of FIG. 8. After operation 906, process flow 900 moves to operation 908.

Operation 908 depicts, in response to performing the determining that at least the threshold amount of data has been modified, replicating, by the system, at least a portion of data that corresponds to the replication policy to a second computer storage cluster. In some examples, operation 908 can be implemented in a similar manner as operation 810 of FIG. 8.

After operation 908, process flow 900 moves to 910, where process flow 900 ends.

Figure 10:
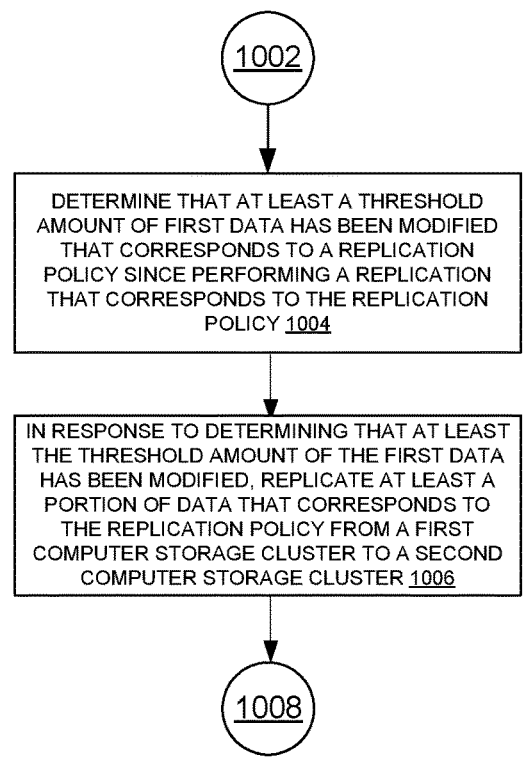
FIG. 10 illustrates an example process flow for data size based replication, in accordance with certain embodiments of this disclosure.

FIG. 10 illustrates an example process flow 1000 for data size based replication, in accordance with certain embodiments of this disclosure. In some examples, aspects of process flow 1000 can be implemented by computing cluster 106*a* of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with aspects of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, and process flow 900 of FIG. 9.

Process flow 1000 begins with 1002 and moves to operation 1004.

Operation 1004 depicts determining that at least a threshold amount of first data has been modified that corresponds to a replication policy since performing a replication that corresponds to the replication policy. In some examples, operation 1004 can be implemented in a similar manner as operation 808 of FIG. 8.

In some examples, operation 1004 comprises registering with a protocol driver that processes data modifications on a file system of the first computer storage cluster to receive notifications about data modifications. In some examples, operation 1004 comprises registering with the protocol driver to receive notifications regarding close-modified, rename, and delete operations. These operations can be ones that result in data being modified, as opposed to—for example, a file open operation. With regard to creating a new file, creating a new file with writing data results in a close-modified event or operation. Then creating a new file without writing does not change a size of the data subject to the replication policy, so can be ignored in some examples.

In some examples, notifications received from the protocol driver identify a file path corresponding to the modified data, an input/output type corresponding to the modified data, and an amount of modified data corresponding to the modified data. This information can be specified separately from the modified data itself, so that data size based replication component 110 can determine this information without analyzing the modified data anew. The input/output type can be a close-modified, rename, or delete operation.

In some examples, operation 1004 comprises, in response to determining that second data on the first computer storage cluster is modified, and that the second data does not correspond to the first replication policy or a second replication policy, discarding information associated with the second data being modified. That is, protocol driver 108 can send data size based replication component 110 notifications of all data modifications of file system 112, regardless of whether a given data modification corresponds to a replication policy. Data size based replication component 110 can analyze the notification from protocol driver 108, and where data size based replication component 110 determines that the notification does not correspond to any replication policies, discard the information of the notification.

After operation 1004, process flow 1000 moves to operation 1006.

Operation 1006 depicts, in response to performing the determining that at least the threshold amount of the first data has been modified, replicating at least a portion of data that corresponds to the replication policy from a first computer storage cluster to a second computer storage cluster. In some examples, operation 1006 can be implemented in a similar manner as operation 810 of FIG. 8.

In some examples, operation 1006 comprises sending an indication to perform the replicating to a daemon that performs replications. For example, in some architectures a first daemon can keep track of how much data has been modified since a previous replication for a replication policy. And a second daemon can perform replications. In such system architectures, the first daemon can send an indication to perform a replication for a particular replication policy to the second daemon, which performs the replication.

After operation 1006, process flow 1000 moves to 1008 where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, aspects of computing environment 1100 can be used to implement aspects of client computer 102, computing cluster 106a, and/or computing cluster 106b of FIG. 1. In some examples, computing environment 1100 can implement aspects of the process flows of FIGS. 2-10 to facilitate data size based replication.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
 a processor; and
 a memory that stores executable instructions that, when executed by the processor, facilitate performance of operations, comprising:
  registering with a protocol driver that processes data modifications on a file system of a first computer storage cluster to receive notifications about close-modified, rename, and delete operations performed via the protocol driver;
  determining that data on the first computer storage cluster has been modified based on a first notification from the protocol driver;
  in response to the determining that the data has been modified, determining that the data corresponds to a replication policy of the first computer storage cluster;
  determining that at least a threshold amount of data has been modified that corresponds to the replication policy since performing a replication that corresponds to the replication policy; and
  in response to performing the determining that at least the threshold amount of data has been modified, replicating at least a portion of data that corresponds to the replication policy to a second computer storage cluster.

2. The system of claim 1, wherein the performing the registering with the protocol driver comprises:
 providing the protocol driver with a callback function that the protocol driver calls to send notifications about data changes.

3. The system of claim 1, wherein the operations further comprise:
 maintaining a first counter that tracks an amount of modified data that corresponds to the replication policy;
 incrementing the first counter by an amount of the data that has been modified;
 wherein the performing the determining that at least the threshold amount of data has been modified comprises
 determining that a first value of the first counter is at least as large as a second value of the threshold amount of data; and
 after successfully performing the replicating of at least the portion of data that corresponds to the replication policy, resetting the first counter.

4. The system of claim 3, wherein the replication is a first replication, and wherein the operations further comprise:
 in response to determining that performing a second replication is unsuccessful, determining not to reset a second counter that corresponds to the second replication.

5. The system of claim 1, wherein the operations further comprise:
 extracting a matched replication policy name corresponding to the data from a file path indicated by a notification received from a protocol driver, the matched replication policy name identifying the replication policy.

6. The system of claim 5, wherein the operations further comprise:
 incrementing a counter that corresponds to the replication policy by an amount of data modified indicated by the notification.

7. A method, comprising:
 registering, by a system comprising a processor, with a protocol driver that processes data modifications on a file system of a first computer storage cluster to receive notifications about close-modified, rename, and delete operations performed via the protocol driver;
 in response to the determining, by the system and based on a first notification received from the protocol driver, that data on a first computer storage cluster is modified, determining that the data corresponds to a replication policy of the first computer storage cluster;
 determining, by the system, that at least a threshold amount of data has been modified that corresponds to the replication policy since performing a replication that corresponds to the replication policy; and
 in response to performing the determining that at least the threshold amount of data has been modified, replicating, by the system, at least a portion of data that corresponds to the replication policy to a second computer storage cluster.

8. The method of claim 7, wherein the performing the determining that the data on the first computer storage cluster is modified comprises:
 receiving, by the system, a notification from the protocol driver indicating that the first data is modified.

9. The method of claim 8, wherein the performing the determining that the data corresponds to the replication policy of the first computer storage cluster comprises:
 determining, by the system, that a file path that is identified by the notification corresponds to the replication policy.

10. The method of claim 9, wherein the replication policy is a first replication policy, and further comprising:
 determining, by the system, that the file path that is identified by the notification corresponds to a second replication policy, wherein a first set of files of the first replication policy differs from a second set of files of the second replication policy.

11. The method of claim 9, further comprising:
 in response to performing the determining that the file path that is identified by the notification corresponds to the replication policy, determining, by the system, that a first file corresponding to the data is omitted from an exclude filter of the first replication policy.

12. The method of claim 9, further comprising:

in response to performing the determining that the file path that is identified by the notification corresponds to the replication policy, determining, by the system, that a first file corresponding to the data is included in an include filter of the first replication policy.

13. A non-transitory computer-readable medium comprising instructions that, in response to execution, cause a system comprising a processor to perform operations, comprising:

registering with a protocol driver that processes data modifications on a file system of a first computer storage cluster to receive notifications about close-modified, rename, and delete operations performed via the protocol driver;

determining, based on a first notification received from the protocol driver, that at least a threshold amount of first data has been modified that corresponds to a replication policy since performing a replication that corresponds to the replication policy; and in response to performing the determining that at least the threshold amount of the first data has been modified, replicating at least a portion of data that corresponds to the replication policy from a first computer storage cluster to a second computer storage cluster.

14. The non-transitory computer-readable medium of claim 13, wherein notifications received from the protocol driver identify a file path corresponding to the first data that has been modified, an input/output type corresponding to the first data that has been modified, and an amount of modified data corresponding to the first data that has been modified.

15. The non-transitory computer-readable medium of claim 13, wherein the performing the replicating of at least the portion of the first data that corresponds to the replication policy comprises:

sending an indication to perform the replicating to a daemon that performs replications.

16. The non-transitory computer-readable medium of claim 13, wherein the replication policy is a first replication policy, and wherein the operations further comprise:

in response to determining that second data on the first computer storage cluster is modified, and that the second data does not correspond to the first replication policy or a second replication policy, discarding information associated with the second data being modified.

17. The method of claim 7, wherein the performing the registering with the protocol driver comprises:

providing, by the system, the protocol driver with a callback function that the protocol driver calls to send notifications about data changes.

18. The method of claim 7, further comprising:

maintaining, by the system, a first counter that tracks an amount of modified data that corresponds to the replication policy;

incrementing, by the system, the first counter by an amount of the data that has been modified;

wherein the performing the determining that at least the threshold amount of data has been modified comprises determining, by the system, that a first value of the first counter is at least as large as a second value of the threshold amount of data; and after successfully performing the replicating of at least the portion of data that corresponds to the replication policy, resetting, by the system, the first counter.

19. The method of claim 18, wherein the replication is a first replication, and further comprising:

in response to determining that performing a second replication is unsuccessful, determining, by the system, not to reset a second counter that corresponds to the second replication.

20. The non-transitory computer-readable medium of claim 13, wherein the performing the registering with the protocol driver comprises:

providing the protocol driver with a callback function that the protocol driver calls to send notifications about data changes.

* * * * *